(12) United States Patent
Eapen

(10) Patent No.: US 10,977,214 B2
(45) Date of Patent: Apr. 13, 2021

(54) DOCUMENT IMAGE SECURITY PROCESSING

(71) Applicant: NCR Corporation, Atlanta, GA (US)

(72) Inventor: Arun George Eapen, Kitchener (CA)

(73) Assignee: NCR Corporation, Atlanta, GA (US)

( * ) Notice: Subject to any disclaimer, the term of this patent is extended or adjusted under 35 U.S.C. 154(b) by 47 days.

(21) Appl. No.: 15/607,821

(22) Filed: May 30, 2017

(65) Prior Publication Data

US 2018/0349049 A1 Dec. 6, 2018

(51) Int. Cl.
| | |
|---|---|
| *G06F 3/06* | (2006.01) |
| *G06F 21/62* | (2013.01) |
| *G06Q 20/10* | (2012.01) |
| *G06F 16/16* | (2019.01) |
| *G06Q 20/18* | (2012.01) |
| *G06Q 20/04* | (2012.01) |
| *G06Q 20/38* | (2012.01) |

(52) U.S. Cl.
CPC ........ *G06F 16/164* (2019.01); *G06F 21/6254* (2013.01); *G06Q 20/042* (2013.01); *G06Q 20/18* (2013.01); *G06Q 20/382* (2013.01); *H04M 2203/6009* (2013.01)

(58) Field of Classification Search
CPC ............... G06F 3/0622; G06F 17/3012; G06F 21/6254; G06F 2221/032; G06Q 20/1085; H04M 2203/60

USPC ......................................................... 715/741
See application file for complete search history.

(56) References Cited

U.S. PATENT DOCUMENTS

| | | | |
|---|---|---|---|
| 2008/0002911 A1* | 1/2008 | Eisen .................. | G06F 21/6245 382/283 |
| 2009/0025063 A1* | 1/2009 | Thomas .............. | G06F 21/6218 726/4 |
| 2011/0182422 A1* | 7/2011 | Anderson ............... | G06F 21/64 380/30 |
| 2017/0132186 A1* | 5/2017 | Plummer ................. | G09C 1/00 |
| 2018/0218170 A1* | 8/2018 | Abi Antoun ....... | G06K 9/00456 |

* cited by examiner

*Primary Examiner* — Tadesse Hailu
*Assistant Examiner* — Darrin Hope
(74) *Attorney, Agent, or Firm* — Schwegman, Lundberg & Woessner

(57) ABSTRACT

A document image is obtained and fine-grain item-specific information within the document image is encrypted with varying levels of encryption, each encryption level associated is with a specific security access role. When the document image is presented to an end-user, the end-user's security access role determines which portions of the fine-grain item-specific information is decrypted and which portions remain encrypted, such that some portions of the document image are obfuscated from the end-user based on the end-user's security access role.

19 Claims, 5 Drawing Sheets

DOCUMENT IMAGE SECURITY PROCESSING

BACKGROUND

Increasingly consumers are conducting financial transactions and performing business accounting through consumer-operated devices, such as: Self-Service Terminals (SSTs) without the assistance of a clerk and mobile device owned/operated by the consumers.

For example, it is fairly common for a consumer to now use a mobile device, such as a phone to take a picture of a check and deposit that check with a bank using a mobile application. In another case, a customer may operate an Automated Teller Machine (ATM) and deposit a check that is scanned and sent to other downstream processing within the bank. In yet another situation, a customer at a grocery store may operate a kiosk and pay or attempt to cash a check, the check is scanned or imaged and sent to a remote clerk for viewing or other downstream processing with the retailer and the customer's bank.

Once the check is imaged, the check may need to be viewed for a variety of reasons by a retailer or a bank. This can occur in real time or at a later date if there is some issue with the check.

This creates security issues for the customer because there is a lot of confidential information on a customer's check, such as name, address, account number, etc. In fact, depending on the situation a variety of personnel within an enterprise may be capable of having access to the check image. Access may be needed by the personnel, but depending on the situation the customer's confidential information present in the check image is usually not necessary to resolve whatever issue the personnel is addressing for the customer.

These situations and other situations unnecessarily expose the customer to potential identity theft by unscrupulous personnel within enterprises.

SUMMARY

In various embodiments, methods and a system for document image security processing is presented.

According to an embodiment, a method for document image security processing is provided. Specifically, and in an embodiment, select information is identified within a document image of a document. Custom encryption is performed on the select information based on a security role. Viewing of the select information is prevented when the document image is viewed unless a viewer has the security role.

DETAILED DESCRIPTION

Figure 1A:
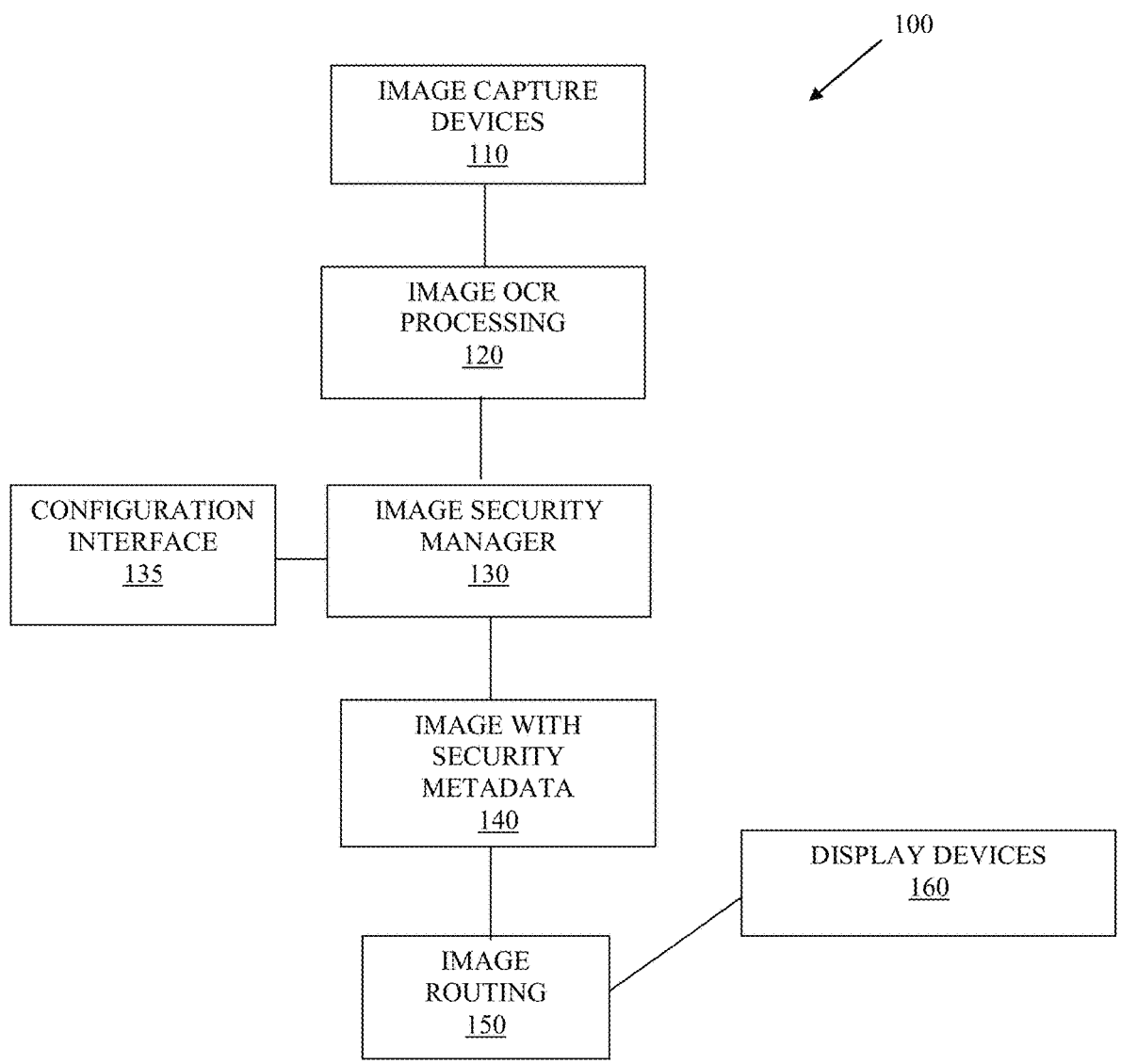
FIG. 1A is a diagram of a system for automatic document image security processing, according to an example embodiment.

FIG. 1A is a diagram of a system 100 for automatic document image security processing, according to an example embodiment. The various components are illustrated and the arrangement of the components is presented for purposes of illustration only. It is to be noted that other arrangements with more or less components are possible without departing from the automatic document image security processing presented herein and below.

The system 100 includes image capture devices 110, an image Optical Character Recognition (OCR) application 120, an image security manager 130, a configuration interface 130, images with security metadata 140, an image router 150, and display devices 160.

As used herein, a "document" includes, a check, a receipt, a report, a government issued identification card (license, passport, etc.), any paper upon which secure information is included. "Secure information" includes: an account number, a name, an address, a social-security number (SSN), a password, a secure code, a birth date, or anything that is considered to be confidential.

The image capture devices 110 can include a variety of devices that include a peripheral camera device or a peripheral scanner and are capable of capturing an image of a document. Such devices 110 include, by way of example only, mobile phones, tablets, laptops, a digital camera, wearable processing devices, an Internet-of-Things (IoT) device, a desktop, a Self-Service Terminal (SST and including an Automated Teller Machine (ATM) and a kiosk), a Point-Of-Sale (POS) terminal, and the like.

A number workflows and applications are designed to capture an image of a document and send such document image over a network connection to downstream processing for OCR processing 120. Some workflows perform on-device OCR processing 120 without sending the document image to any downstream device (that is OCR processing 120 is performed on the same device that the document image was captured on). During the OCR processing 120, characters of information are identified from the pixels in the document image, the output of the OCR processing 120 is an electronic editable form of the document image. The OCR processing 120 also provides a mapping back to the image for the corresponding pixel locations that represent each of the individual characters in the editable version of the document image.

Following the OCR processing 120 the workflow for the document image is modified to call the image security manager 130. The image security manager 130 is configured through the configuration interface 135. The configuration interface 135 can include a graphical user interface (GUI), which can be browser-based. Options within the configuration interface 135 allows an analyst or end-user to define within document types (such as checks, reports, government identification cards, etc.) where secure information resides within a generic layout for a selected document type. Options can also allow secure information to be defined based on its format, such as a SSN is in the format of NNN-NN-NNNN, where N is a digit 0-9. So, the configuration interface 135 permits an analyst to define within a generic layout or image for a selected document type (in terms of its location relative to other information) where secure information is present and/or to define a pattern for identifying secure information.

The configuration interface 135 also includes options for defining what type of secure information is being identified for a selected document type, such as: account number, name, address, date of birth, SSN, etc. Furthermore, the configuration interface 135 provides options for the analyst to assign a security level for access rights to the type of security information defined for a selected document type. The security level for access rights can include visible or invisible to a user having a specific role. For example, in a bank, a teller security role for a teller user has lower security access rights within workflows of the bank's systems than does a branch manager of the bank. So, the analyst can interact with the configuration interface 135 to define where secure information is present for a document type associated with a check, identifying the types of secure information, and assign different levels of security for each secure information type within the check, such that a teller when viewing the check cannot see secure information of a customer. Conversely, a branch manager security role can be assigned viewing rights to the secure information. In this manner, the configuration interface 135 permits fine-grain on a security information type level based on specific access roles.

Once the image security manager 130 is configured for identifying secure information (also referred to herein as "security information") and assigning fine-grain view or non-view access based on workflow security roles, the image security manager 130 is configured to process images received following the OCR processing 120. As stated before, the OCR processing 120 provides pixel coordinates present in a processed image for each character of information identified. A single character can include a set of pixel coordinates that identify that character. The security manager 130 processes the image and the electronic character recognized file with the configuration settings provided from an analyst in the configuration interface 135, and the security manager 130 produces metadata 140 that is assigned to the image file for the document being processed.

The metadata 140 includes the pixel coordinates for areas representing the secure information identified in the image as well as the assigned security roles. The metadata 140 can be included with the image or provided as a separate file with the image. The image with the security metadata 140 is then passed through an image router 150 to subsequent processes in one or more workflows of an enterprise. In some cases, the image and the metadata 140 can be stored and retrieved as needed for a workflow from storage. A subsequent workflow that retrieves the image with the metadata within that workflow. In other cases, when the image is accessed an event is raised that calls the image router 150 and the image router 150 retrieves the metadata associated with the image from a separate storage.

Within any workflow, the application that displays the image is modified to alter the image in accordance with the metadata 140 or that application receives the image in a modified format in accordance with the metadata 140. So, if an application is invoked to display an image that has the associated metadata 140, the image router 150 may be called to modify the image in accordance with the metadata before the image is provided to the display device 160. Alternatively, functionality to modify the image in accordance with the metadata can be embedded in the application that displays the image on the display device 160.

The user that makes for the image or the workflow that provides the image to a user has an assigned security role within the context of the request or provision of the image. The image router 150 or the application then receives the following information, the image, the metadata 140, and the user's assigned security role. The metadata 140 is processed to modify the image such that only the secure information that the user is allowed to see is visible in the image of the document being viewed on the display device 160 (based on the assigned security role of the user and the secure information type setting present in the metadata). The image is altered so as to blank out, white out, or otherwise obfuscate the secure information present in the document image that the user is not authorized to see. This is done by changing the pixel values in the document image associated with the secure information to obfuscate the secure information, such that it is unable to be viewed on the display device 160.

A variety of modifications can be made to the above-discussed. For example, the configuration interface 135 can include options to define zones of information in document types and assign security settings based on the zones and assign a specific pixel color to use when obfuscating the modified image from viewing on the display device 160. The obfuscation can be encrypted or may be viewed as encrypted since it is not visible.

In an embodiment, the secure information is encrypted before being stored, the level of encryption is based on the security of the end user that attempts to access the image, such that an encryption level of a teller (a lower security role) is lower than an encryption level for a bank branch manager (higher security role). In this embodiment, metadata 140 does not have to be carried with stored separate from the image; rather, when the image is retrieved for displaying and the viewing user's security role is known, those pieces of secure information that the user is permitted to be viewed are successfully decrypted whereas those pieces of secure information that the user is not permitted to view remain encrypted such that the user only views on the display device 160 what the user is permitted to view and the other portions of secure information remain encrypted and obscured from view. In this embodiment, metadata 140 is not needed as all secure information is encrypted following the OCR processing by the image security manager 130 and each encrypted piece of secure information includes a different type of encryption that is based on the security role assigned through the configuration interface 135 for that type of document. Here, the image is stored with different pieces of information being encrypted and those pieces may have different types of encryption.

The display devices 160 can include any device having a display, such as, a SST, POS terminal, an ATM, a Kiosk, a mobile device, a digital sign, a wearable processing device, a display connected to a server, a laptop, a desktop, an IoT device, a smart TV, and the like.

The above-discussed processing includes a variety of beneficial advantages over existing image processing, such as but not limited to: sensitive drawer's information on checks is not displayed to end users without the necessary security permissions, during remote debugging by support staff of an enterprise for a customer issue the sharing of secure (sensitive) customer information is avoided, the process can be added for report generation such that sensitive information in components of reports are only viewed by those that are allowed to view (a single report can be disseminated within the enterprise an each end user only sees the information that they are permitted to see), the processing can be configured to the security roles assigned by an enterprise, remote assistance at SSTs where customer identification is required can obscure sensitive customer information from the remote assistance personnel, etc.

Figure 1B:
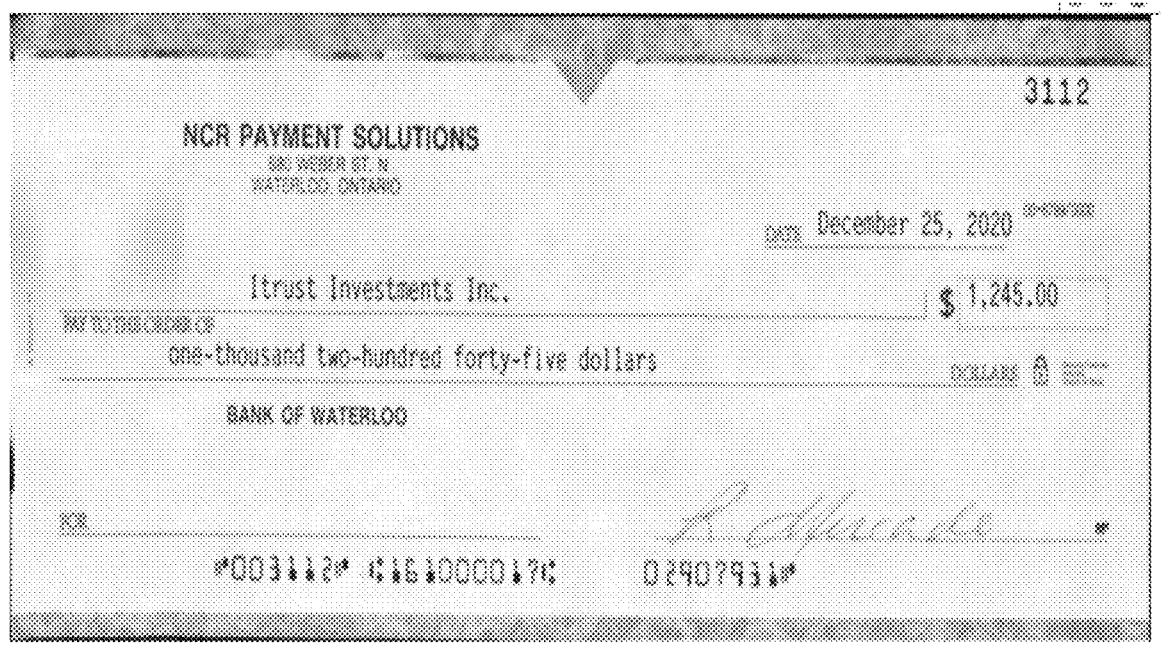
FIG. 1B is an image of a check before the automatic image security processing, according to an example embodiment.

The FIG. 1B is an image of a check before the automatic image security processing, according to an example embodiment.

As previously discussed a check is one type of document. The sample check shows an image as captured by an image capture device 110 within a workflow of an enterprise, such as a bank. All the information is available for viewing in the image.

Figure 1C:
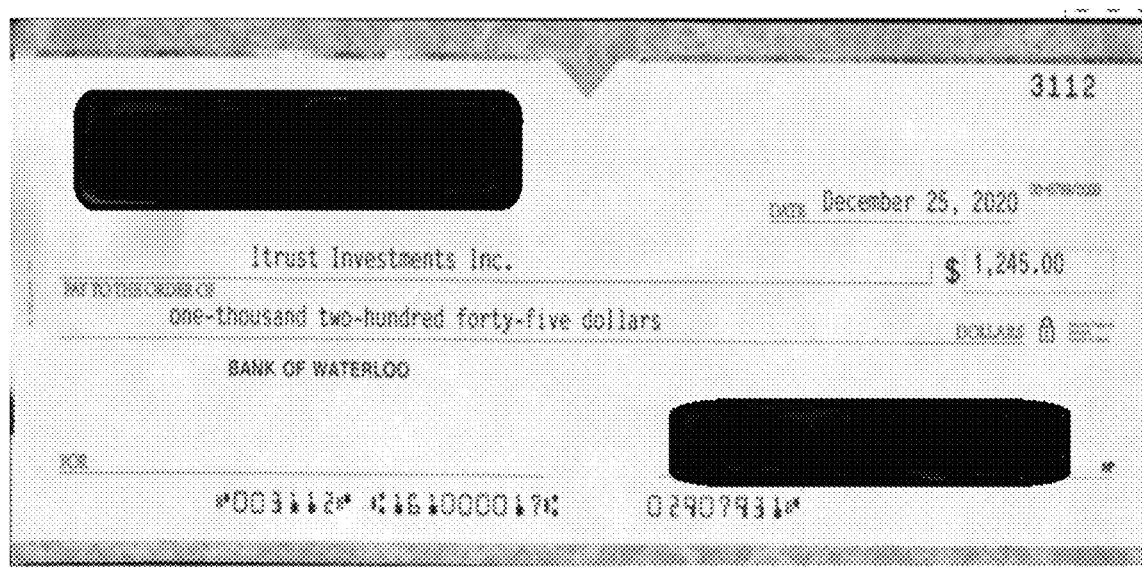
FIG. 1C is an image of the check from the FIG. 1B after the automatic image security processing, according to an example embodiment.

The FIG. 1C is an image of the check from the FIG. 1B after the automatic image security processing of the system 100, according to an example embodiment.

The payor name and address as well as the payor's signature (endorsement) has been encrypted from view on the display device 160 of the end user that is viewing the image of the check. This was done based on the assigned security role of the end user operating the display device 160.

As stated above, the image may be custom encrypted in specific pixel locations (and with varying levels and types of encryption) and the modified image stored. Alternative, this may be done when the image is being rendered through the user of the metadata 140. Both techniques were discussed above with the FIG. 1A.

These and other embodiments are now discussed with reference to the FIGS. 2-4.

Figure 2:
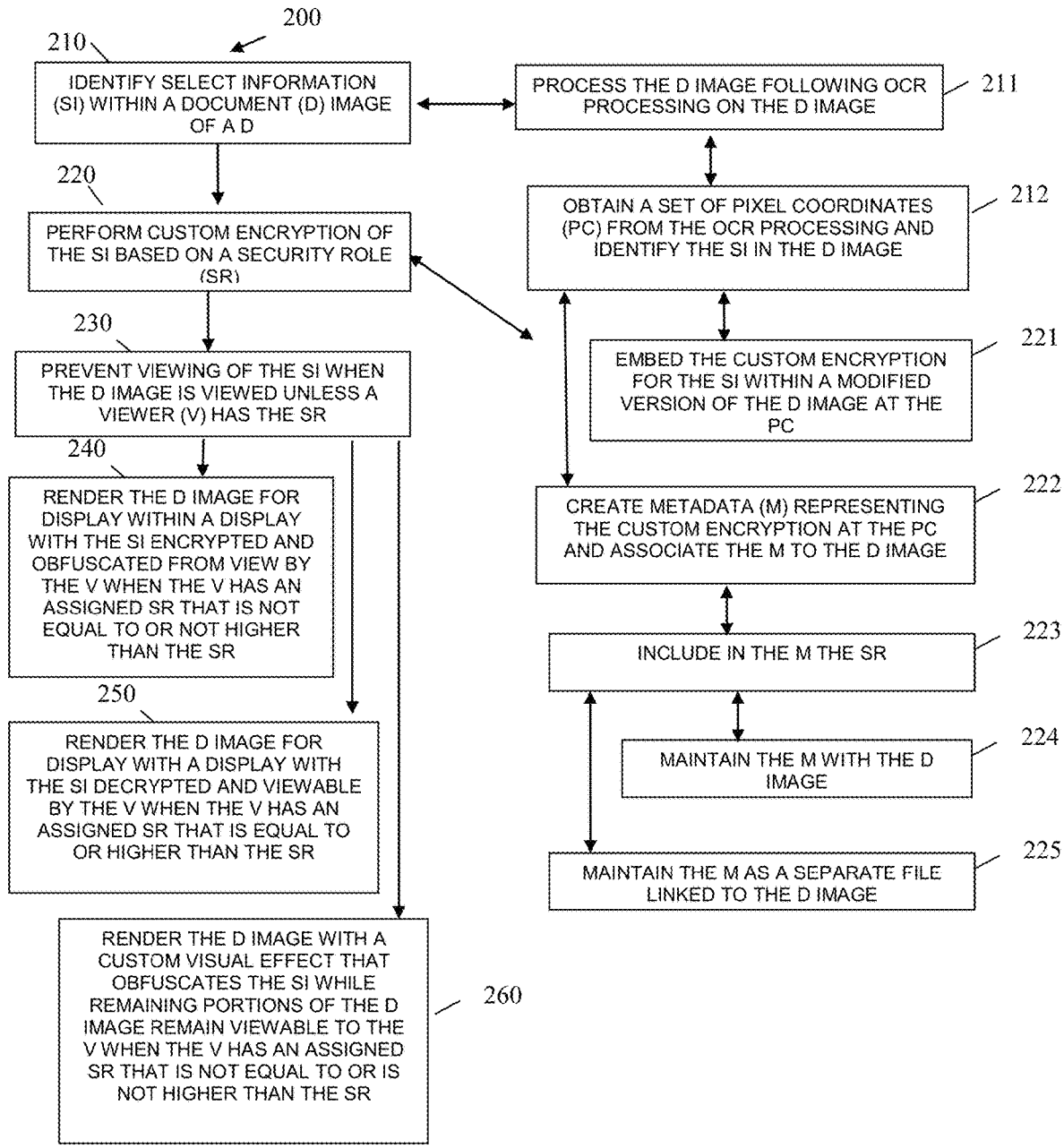
FIG. 2 is a diagram of a method for automatic document image security processing, according to an example embodiment.

FIG. 2 is a diagram of a method 200 for automatic document image security processing, according to an example embodiment. The software module(s) that implements the method 200 is referred to as an "image security manager." The image security manager is implemented as executable instructions programmed and residing within memory and/or a non-transitory computer-readable (processor-readable) storage medium and executed by one or more processors of a device. The processor(s) of the device that executes the image security manager are configured and programmed to process the image security manager. The image security manager has access to one or more networks during its processing. The networks can be wired, wireless, or a combination of wired and wireless.

In an embodiment, the device that processes the image security manager is any device embedded in a workflow within an enterprise (such as but not limited to a server) where an image is received following OCR processing 120.

In an embodiment, the device that processes the image security manager is a SST. In an embodiment, the SST is an ATM. In an embodiment, the SST is a kiosk.

In an embodiment, the device that processes the image security manager is a server. In an embodiment, the server is part of a cloud.

In an embodiment, the image security manager performs all or some combination of the processing discussed above with the FIGS. 1A-1C.

At 210, the image security manager identifies select information with a document image of a document image of a document. The select information is zones or portion of an image for a defined document type (such as a check or a report or even different types of checks having varying sizes and information therein).

In an embodiment, the secure information is any of the secure, sensitive, security, and/or confidential information discussed above with the FIGS. 1A-1C.

According to an embodiment, at 211, the image security manager processes the document image following OCR processing of the document image. In an embodiment, the OCR processing is the OCR processing 120.

In an embodiment of 211 and at 212, the image security manager obtains a set of pixel coordinates from the OCR processing and identifies the secure information in the document image based on the set of pixel coordinates that corresponds to the location or pattern for the secure information within the document image.

At 220, the image security manager performs custom encryption of the secure information based on a security role for a specific type of user (viewer) that is permitted to view the secure information when the document image is rendered to a display of the viewer.

In an embodiment of 212 and at 221, the image security manager embeds the custom encryption for the secure information within a modified version of the document image at the pixel locations within the document image.

In an embodiment of 212 and at 222, the image security manager creates metadata representing the custom encryption at the pixel coordinates and associates the metadata with the document image.

In an embodiment of 222 and at 223, the image security manager includes in the metadata the security role.

In an embodiment of 223 and at 224, the image security manager maintains the metadata with the document image.

In an embodiment of 223 and at 225, the image security manager maintains the metadata as a separate file linked to the document image.

At 230, the image security manager prevents viewing of the secure information when the document image is viewed unless a viewer has the secure role. That is, the document image can be viewed with all its portions except the secure information is obfuscated from being viewed unless the viewer has the security role.

According to an embodiment, at 240, the image security manager renders the document image for display within a display with the secure information encrypted and obfuscated from view by the viewer when the viewer has an assigned security role that is not equal to or higher than the security role associated with the custom encryption and the secure information.

In an embodiment, at 250, the image security manager renders the document image for display within a display with the secure information decrypted and viewable by the viewer when the viewer has an assigned security role that is equal to or higher than the security role.

In an embodiment, at 260, the image security manager renders the document image with a custom visual effect that obfuscates the secure information while remaining portions of the document image remain viewable to the viewer when the viewer has an assigned security role that is not equal to or is not higher than the security role.

Figure 3:
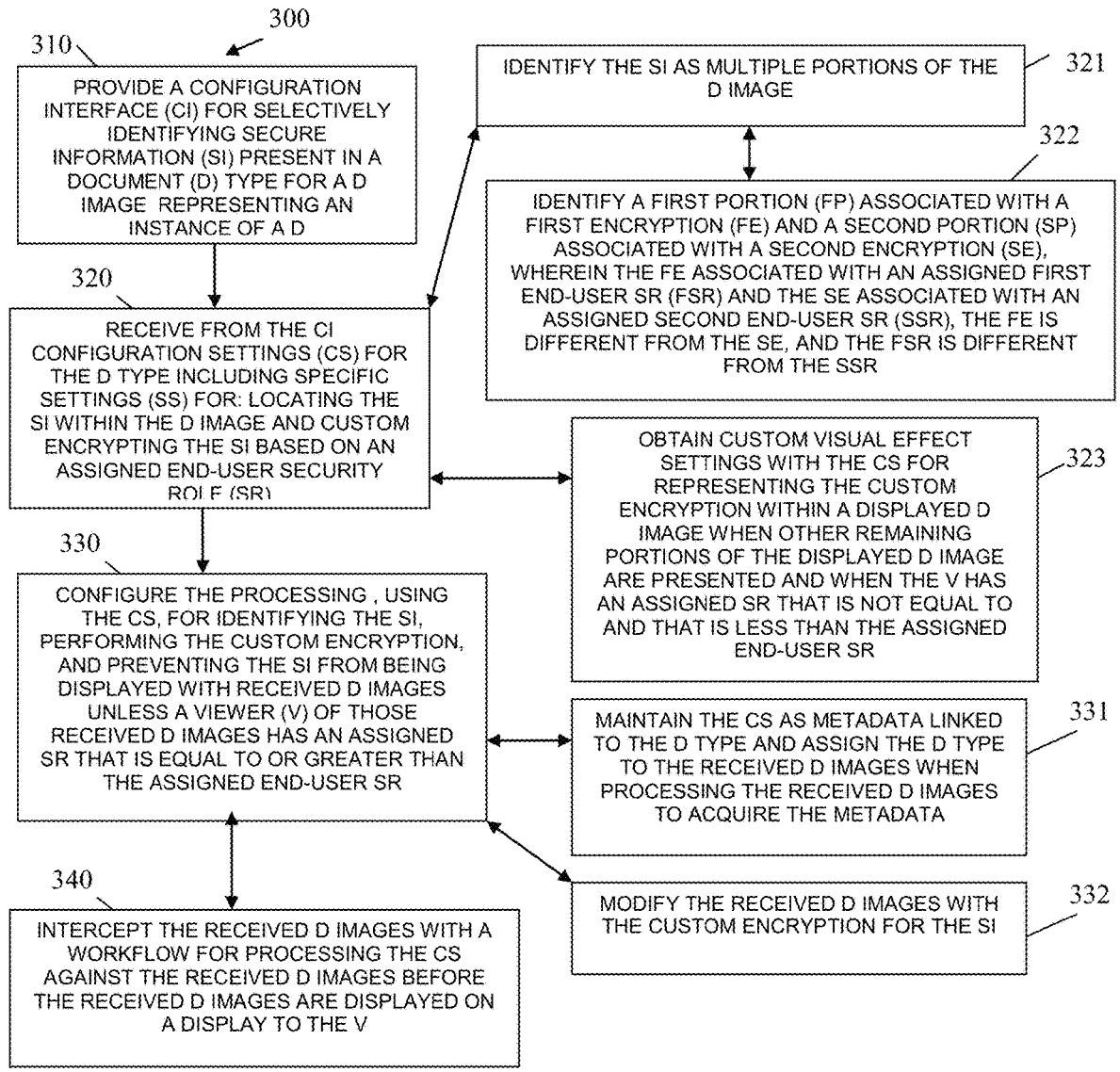
FIG. 3 is a diagram of another method for automatic document image security processing, according to an example embodiment.

FIG. 3 is a diagram of another method 300 for automatic document image security processing, according to an example embodiment. The software module(s) that implement the method 300 is referred to herein as a "fine-grain image security controller." The fine-grain image security controller is implemented as executable instructions and programmed within memory and/or a non-transitory computer-readable (processor-readable) storage medium that executes on one or more processors of a device. The processors of the device are specifically configured to execute the fine-grain image security controller. The fine-grain image security controller can access one or more networks; the networks can be wired, wireless, or a combination of wired and wireless.

The fine-grain image security controller presents another and in some ways enhanced processing perspective of the image security manager (discussed above with reference to the FIG. 2).

In an embodiment, the fine-grain image security controller is the image security manager of the FIG. 2.

In an embodiment, the fine-grain image security controller performs all or some combination of the processing discussed above with the FIG. 1A-1C.

In an embodiment, the device that processes the fine-grain image security controller is any device embedded in a workflow within an enterprise (such as but not limited to a server) where an image is received following OCR processing 120.

In an embodiment, the device that processes the fine-grain image security controller is a SST. In an embodiment, the SST is an ATM. In an embodiment, the SST is a kiosk.

At 310, the fine-grain image security controller provides a configuration interface for selectively identifying secure information present in a document type for a document image representing an instance of a document. In an embodiment, the configuration interface is the interface 135 of the FIG. 1A.

At 320, the fine-grain image security controller receives from the configuration interface configuration settings for the document type including specific settings for locating the secure information within the document image and custom encrypting the secure information based on an assigned end-user security role.

According to an embodiment, at 321, the fine-grain image security controller identifies the secure information as multiple portions of the document image. That is there is multiple sets of information representing different types of secure information within the document type.

According to an embodiment of 321 and at 322, the fine-grain image security controller identifies a first portion associated with a first encryption and a second portion associated with a second encryption. The first encryption associated with an assigned first end-user security role and the second encryption is associated with an assigned second end-user security role. Moreover, the first encryption is different from the second encryption and the assigned first end-user security role is different from the assigned second end-user assigned security role. That is, the document type identifies multiple different types of security information and each type includes a different encryption for a different security role.

In an embodiment, at 323, the fine-grain image security controller obtains custom visual effect settings with the configuration settings for representing the custom encryption within a displayed document image when other remaining portions of the displayed document image are presented and when the viewer has an assigned security role that is not equal to and that is less than the assigned end-user security role. For example, the secure information can be custom presented with a customer color, such as red, blue, green, black, etc.

At 330, the fine-grain image security controller configures itself for using the configuration settings when the document type is identified. The configuration permitting the fine-grain image security controller to identify the secure information and prevent the secure information from being displayed with received document images unless a viewer of those received document images has an assigned security role that is equal to or greater than the assigned end-user security role.

In an embodiment, at 331, the fine-grain image security controller maintains the configuration settings as metadata linked to the document type and assigns the document type to the received document image when processing the received document images for purposes of acquiring the metadata.

In an embodiment, at 332, the fine-grain image security controller modifies the received document images with the custom encryption for the secure information.

According to an embodiment, the fine-grain image security controller intercepts the received document images with a workflow for processing the configuration settings against the received document images before the received document images are displayed on a display to the viewer.

Figure 4:
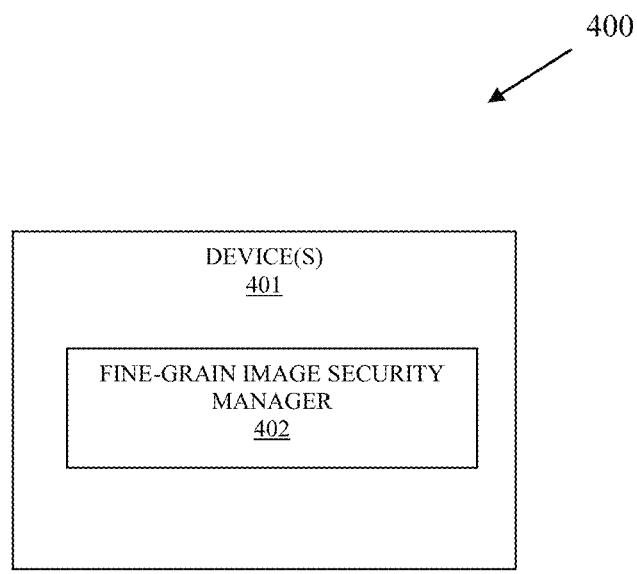
FIG. 4 is a diagram of a system that performs automatic document image security processing, according to an example embodiment.

FIG. 4 is a diagram of system 400 that performs automatic document image security processing, according to an example embodiment. The components of the system 400 are programmed and reside within memory and/or a non-transitory computer-readable medium and execute on one or more processors of one or more devices. The system 400 has access and can communicate over one or more networks; and the networks can be wired, wireless, or a combination of wired and wireless.

In an embodiment, the system 400 performs some or all of the processing, inter alia, associated with the FIGS. 1A-1C and/or 2-3.

The system 400 includes one or more devices 401 and a fine grain image security manager 402.

The fine-grain image security manager 402 configured to: (i) execute on one or more hardware processors of the one or more devices 400, (ii) selective encrypt secure portions of a document image for a document, (iii) control display presentations for the document image to maintain the selective encrypted secure portions of the document image when a viewer of the presentations lacks security permissions to view the secure portions.

In an embodiment, the fine-grain image security manager 402 is further configured to (iv) decrypt the secure portions of the document image for viewing with the presentations when the viewer has the security permissions to view the secure portions.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
receiving, from a browser-based Graphical User Interface (GUI), options selected by and inputs provided by an end-user that defines: document types for documents, patterns defining formats associated with document secure information within each corresponding document, locations of the patterns in each corresponding document, and security levels being assigned for security information types of the corresponding patterns associated with the corresponding document secure information;
receiving a document image for a given document;
determining given options and given inputs for a given document type associated with the given document;
performing optical character recognition on the document image producing an editable version of the document image and producing a mapping between characters in the editable version of the document image back to the document image;
identifying select information within the given document based on: the mapping, the given document type assigned to the given document, the given options, the given inputs, and a layout associated with the given document type, wherein the layout defining a given pattern for identifying the secure information and given locations for the select information relative to other locations without the select information, wherein the select information comprises a plurality of given secure information types for portions of the select information, and wherein each given secure information type assigned a different level of security with respect to viewing and accessing corresponding given secure information associated with the corresponding given secure information type;
performing custom encryption of the select information based on a security role and different level of security associated with each secure information of the select information; and
preventing viewing of the select information when the document image is viewed unless a viewer has the security role.

2. The method of claim 1, wherein processing further includes obtaining a set of pixel coordinates from the mapping and identifying the select information in the document image.

3. The method of claim 2, wherein performing further includes embedding the custom encryption for the select information within a modified version of the document image at the set of pixel coordinates.

4. The method of claim 2, wherein performing further includes creating metadata representing the custom encryption at the set of pixel coordinates and associating the metadata to the document image.

5. The method of claim 4, wherein creating further includes including in the metadata the security role.

6. The method of claim 5, wherein including further includes maintaining the metadata with the document image.

7. The method of claim 5, wherein including further includes maintaining the metadata as a separate file linked to the document image.

8. The method of claim 1, wherein preventing further includes rendering the document image for display within a display with the select information encrypted and obfuscated from view by the viewer when the viewer has an assigned security role that is not equal to or not higher than the security role.

9. The method of claim 1, wherein preventing further includes rendering the document image for display within a display with the select information decrypted and viewable by the viewer when the viewer has an assigned security role that is equal to or higher than the security role.

10. The method of claim 9, wherein preventing further includes rendering the document image with a custom visual effect that obfuscates the select information while remaining portions of the document image remain viewable to the viewer when the viewer has an assigned security role that is not equal to or is not higher than the security role.

11. A method, comprising:
providing a browser-based Graphical User Interface (GUI) as a configuration interface;
obtaining, from the configuration interface, secure information present in a document type for a document image representing an instance of a document;
permitting, by the configuration interface, the document type to define a layout for the document type, wherein the layout comprises locations that identify the secure information relative to other locations without the secure information for the document type and the layout identifying a pattern for the secure information for the document type;
receiving from the configuration interface configuration settings for the document type including specific settings for: locating the secure information within the document image based on the locations, the pattern defined in the document type, and custom encrypting the secure information based on an assigned end-user security role, wherein the secure information comprises a plurality of secure information types for portions of the secure information, and wherein each secure information type assigned a different level of security with respect to viewing and accessing corresponding secure information associated with that secure information type;
configuring the method for identifying the select information in received document images by using the custom settings and mappings between characters in editable versions of the received document images back to the received document images, wherein the mappings are produced by optical character recognition pre-processed on the received document images; and
preventing the select information from being displayed with the received document images unless a viewer of those received document images has an assigned security role that is equal to or greater than the assigned end-user security role and based on the corresponding different level of security associated with the corresponding portion of the select information that is attempting to be accessed by the viewer.

12. The method of claim 11, wherein receiving further includes identifying the secure information as multiple portions of the document image.

13. The method of claim 12, wherein identifying further includes identifying a first portion associated with a first encryption and a second portion associated with a second encryption, wherein the first encryption associated with an assigned first end-user security role and the second encryption associated with an assigned second end-user security role, and wherein the first encryption is different from the second encryption, and the assigned first end-user security role is different from the assigned second end-user security role.

14. The method of claim 11, wherein receiving obtaining custom visual effect settings with the configuration settings for representing the custom encryption within a displayed document image when other remaining portions of the displayed document image are presented for when the viewer has an assigned security role that is not equal to and that is less than the assigned end-user security role.

15. The method of claim 11, wherein configuring further includes maintaining the configuration settings as metadata linked to the document type and assigning the document type to the received document images when processing the received document images to acquire the metadata.

16. The method of claim 11, wherein configuring further includes modifying the received document images with the custom encryption for the secure information.

17. The method of claim 11, wherein configuring further includes intercepting the received document images within a workflow for processing the configuration settings against the received document images before the received document images are displayed on a display to the viewer.

18. A system, comprising:
one or more devices; and
a fine-grain image security manager configured to: (i) execute on one or more hardware processors of the one or more devices, (ii) selective encrypt secure portions of a document image for a document based on: 1) a mapping between characters in an editable version of the document image back to the document image, wherein the mapping is produced by optical character recognition pre-processed on the document image; and 2) a document type assigned to the document, the document type assigned a layout and the layout defining a pattern to identify the secure portions for the document type and locations having the secure portions relative to other locations without the secure portions for the document type, (iii) control display presentations for the document image to maintain the selective encrypted secure portions of the document image when a viewer of the presentations lacks security permissions to view the secure portions, wherein each selective encrypted secure portion assigned a different level of security based on a corresponding secure information type assigned to that selective encrypted secure portion, and wherein the viewer is required to be assigned to a given security role when accessing a given selective encrypted portion, and wherein the document type, the layout, the pattern, the locations, and levels of security are received as options and inputs provided by an end-user through a browser-based Graphical User Interface (GUI).

19. The system of claim 18, wherein the fine-grain image security manager is further configured to (iv) decrypt the secure portions of the document image for viewing with the presentations when the viewer has the security permissions to view the secure portions.

* * * * *